United States Patent Office 2,788,285
Patented Apr. 9, 1957

2,788,285

ADHESIVE COMPOSITIONS AND RELATED METHOD

James G. Lander, Painesville, Ohio, assignor to Diamond Alkali Company, Cleveland, Ohio, a corporation of Delaware No Drawing. Application May 15, 1953,
Serial No. 355,407

6 Claims. (Cl. 106—80)

This invention relates to a composition of matter comprising aqueous adhesive silicate glass, which composition is characterized by high adhesiveness to cellulose-containing materials, such as paper surfaces employed in laminated paper articles, but which is also characterized by lack of adhesion to heated metal surfaces. It relates also to the method of preparing boxboard which includes use of the new composition.

One of the steps of a typical paper laminating operation involves the pressing of the composite sheet after the adhesive has been applied to the plies and such plies have been arranged in laminated relationship. Generally, in the manufacture of corrugated paperboard, this operation is conducted by passing an advancing laminated web of paper over a series of heated platens and pressing the web against the heated platens by means of one or more rollers, whereby the silicate glass is dehydrated and the laminations are united, thus forming a bond between the laminates.

In the manufacture of corrugated paperboard and similar laminates, the silicate glass adhesive may, for example, be applied to the peaks of the corrugations on one side of a corrugated sheet, which sheet is then contacted with a plane-surface facing sheet, and the composite thus formed passed over heated platens, while being subjected to pressure insufficient to destroy the corrugations of the corrugated member but sufficient to effect the bonding of the paper sheets. Thereafter, in accordance with this exemplary method of forming 3-ply laminates, the laminated structure may be coated a second time with an adhesive silicate glass at the peaks of the exposed corrugated surface of the laminate, and the thus-coated structure then formed brought into contact with a second plane-surface and the whole laminate again passed in contact with heated platens, while being subjected to pressure insufficient to destroy the corrugations of the corrugated member but sufficient to effect bonding of the laminate.

Difficulties in the manufacture of such corrugated paperboard arise when aqueous adhesive silicate glass comes into contact with the corrugating and pressure rolls, and the platens of the hot plate driers, forming hard glass-like deposits thereon, thus fouling the rolls and necessitating interrupting production to remove said deposits. Further, as the laminated structure passes between the pressure rollers and the platens of the hot-plate driers, some of the adhesive silicate glass exudes from the portions of the laminate nearest the edges thereof and to be deposited upon the heated surface of the platens. After a relatively short period of time, these deposits of the exuded adhesive silicate material accumulate upon the surface of the platens and build up into ridges or mounds near the region of the edges of the moving laminated web under the influence of the relatively intense heat of the platen surface are dehydrated to a hard, strongly adherent, solid silicate glass. These deposits are then in a position to effect the destruction of the edges of the moving laminated structure passing across the heated platen surface. Moreover, as the production of laminated webs of lesser and greater widths may be scheduled alternately during a given production period, the change-over from the lesser to the greater widths may leave deposits of the dehydrated silicate glass in a position to mar substantial areas longitudinally of the wider webs. When the accumulation of the deposits of dehydrated silicate glass are sufficient to cause the destruction of substantial areas of the wider laminated webs passing thereover, the whole operation must be interrupted and the heated platens cleaned before further production of such wider webs may be started. A major difficulty in the cleaning operation arises from the fact that the dehydrated silicate glass adheres quite strongly to the platens, requiring considerable time and hand labor to dislodge the deposit and refinish the surface.

It is now known that by the addition of urea to an otherwise suitable silicate adhesive composition, the problem that is present as indicated above no longer exists, for, thereby an adhesive is produced which is as effective as the unmodified silicate adhesive insofar as securing the laminates is concerned and which is substantially self-releasing from the heated metal surfaces. The quantity of urea that has been suggested for addition to the silicate adhesive has been indicated as being about 8 to 15% of the adhesive mixture. Other quantities may be added but better results seem to be produced by the stated percentages.

As urea is an expensive additive, it is desirable to maintain the quantity that is added as low as possible without losing the desired self-releasing function. At the same time it is desirable to produce an adhesive having a high degree of moisture resistance as high humidity conditions may deleteriously affect a bond that is otherwise strong.

The present invention is directed to a composition and method for decreasing the adhesion of an adhesive silicate glass composition to heated metal surfaces generally.

Another object of the invention is to provide a method and composition for preventing the adhesion of aqueous adhesive silicate glasses commonly employed in the paper laminating industry to the heated metal surfaces of the platens used for forming laminates.

A further object of this invention is to produce a self-releasing adhesive requiring a low percentage of urea and which at the same time has good resistance to high humidity conditions.

These and other objects will occur to those skilled in the art from the description of the invention set forth below.

The present invention contemplates the combination of a major proportion of aqueous silicate solution of materials which, while they do not interfere with the ultimate adhesiveness of the dehydrated adhesive silicate glass, nevertheless provide properties of non-adhesiveness to the heated metallic surfaces which come in contact with the composition, especially parts of boxboard manufacturing equipment.

The compositions of the invention include, in addition to the adhesive sodium silicate solution, suitable quantities of urea, which may be ordinary technical grade, sugar, which may suitably be the cheapest obtainable, such as tanners sugar, a fluoborate such as sodium fluoborate, alkali metal chromate or bichromate, suitably sodium bichromate, a finely divided clay, which may be any predominantly aluminum silicate material of sufficient fineness, i. e., of the order of the average particle size of a few microns diameter, and of which Barden Clay is satisfactory, and water. No criticality lies in the manner of combining these ingredients but it has been found convenient to dissolve the sugar initially in relatively hot water, such as of the order of 150° F., add the urea to the sugar solution, whereupon the temperature of the solution decreases, depending upon the amount of urea, to below 100° F., add the fluoborate and the alkali metal chromate or bichromate, and when this combination of materials is thoroughly homogeneous, add it to the silicate solution with vigorous agitation and in relatively small increments. Finally, to complete the composition, the clay is added.

The method of the invention may suitably be carried out by employing a composition prepared as described above in a known type of boxboard or other laminated paper manufacturing machine and in a manner entirely equivalent to that used for ordinary untreated silicate adhesive.

While the relative proportions of the materials in the composition of the invention are not highly critical, it has been found that suitable materials, in the sense of high adhesiveness to boxboard structures and low adhesiveness to heated surfaces of boxboard machines, the latter being sufficiently low so that a moving web of paper dislodges deposits without damage to the paper, comprise between 60–75% of aqueous silicate glass solution containing 35–45% solids and averaging on the weight basis 1 part of $Na_2O$ to between 2.5 and 4 parts of $SiO_2$, and suitably within the range of $1Na_2O$ to 3–3.5 $SiO_2$, preferably about $1Na_2O$ to 3.3 parts of $SiO_2$, and which may suitably contain a small amount of an anionic wetting agent, of which aromatic monosodium sulfonates derived from petroleum oil, alkyl aryl sulfonates, coconut oil sulfonates, and the like are examples, an exemplary quantity being about 1%, between 2 and 10% of urea, between 0.5 and 3% of sugar, between 0.1 and 1% of alkali metal bichromate, between 0.5 and 4% of sodium fluoborate and the balance to make 100% water.

In order that those skilled in the art may have a clear understanding of the invention and its preferred mode of practice the following specific example is offered:

*Example*

A composition is formulated as follows:

| | Percent |
|---|---|
| Sodium silicate solution containing 1% alkyl aryl sulfonate wetting agent (40.8° Bé) 37.7–8% solids ($Na_2O:SiO_2$ ratio, 1:3.3) | 67.0 |
| Urea | 5.0 |
| Tanners sugar | 1.0 |
| Sodium bichromate | 0.2 |
| Sodium fluoborate | 2.0 |
| Barden clay | 11.0 |
| Water | 13.8 |

A second exemplary composition is one identical with the foregoing example except that the wetting agent there suggested though preferably present, is omitted, the quantity of silicate being 67 percent. The order of combining the ingredients is as described hereinabove.

The action of the composition of this invention on the hot metallic surfaces of a paperboard machine including the platens is notably different from that of prior art silicate compositions, since the composition of this invention when dried on such hot surfaces is readily dislodged by the passage of further paperboard in contact therewith and without damage to such paperboard. The paperboard product therein employing this composition is equivalent in every respect to that produced with prior art aqueous silicate solutions. It has the additional advantage of providing a somewhat more moistureproof bond than has been the case either with prior art straight silicate compositions or even the readily platen-freeing compositions comprising urea and adhesive silicate, which latter compositions do not form part of this invention. The presence of a modicum of fluoborate in the compositions appears to contribute this increased humidity resistance, especially when the paperboard is exposed to high humidity conditions.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of preparing paperboard, which includes the steps of applying to one of a plurality of paper webs, as the adhesive therefor a composition of matter consisting essentially of the following ingredients:

| | Percent |
|---|---|
| Aqueous silicate glass solution ($Na_2O:SiO_2$ ratio, 1:2.5–4, 35–45% solids) | 60–75 |
| Urea | 2–10 |
| Sugar | 0.5–3 |
| Sodium bichromate | 0.1–1 |
| Sodium fluoborate | 0.5–4 |
| Barden clay | 0–11 |
| Water | Balance to 100 parts | contacting the surface of said web to which said composition has been applied with another paper web, and applying heat and pressure to the composite of said webs to dehydrate said composition and form a bond uniting said webs.

2. The method of preparing paperboard, which includes the steps of applying to one of a plurality of paper webs, as the adhesive therefor, a composition of matter consisting essentially of the following ingredients:

| | Percent |
|---|---|
| Sodium silicate solution (40.8° Bé) 37.7–8% solids ($Na_2O:SiO_2$ ratio, 1:3.3 plus a small amount of anionic wetting agent) | 67.0 |
| Urea | 5.0 |
| Tanners sugar | 1.0 |
| Sodium bichromate | 0.2 |
| Sodium fluoborate | 2.0 |
| Barden clay | 11.0 |
| Water | 13.8 | contacting the surface of said web to which said composition has been applied with another paper web, and applying heat and pressure to the composite of said webs to dehydrate said composition and form a bond uniting said webs.

3. The method of preparing paperboard, which includes the steps of applying to one of a plurality of paper webs, as the adhesive therefor, a composition of matter consisting essentially of the following ingredients:

| | Percent |
|---|---|
| Sodium silicate solution (40.8° Bé) 37.7–8% solids ($Na_2O:SiO_2$ ratio, 1:3.3) | 67.0 |
| Urea | 5.0 |
| Tanners sugar | 1.0 |
| Sodium bichromate | 0.2 |
| Sodium fluoborate | 2.0 |
| Barden clay | 11.0 |
| Water | 13.8 | contacting the surface of said web to which said composition has been applied with another paper web, and applying heat and pressure to the composite of said webs to dehydrate said composition and form a bond uniting said webs.

4. A composition of matter comprising:

| | Percent |
|---|---|
| Aqueous silicate glass solution (Na$_2$O:SiO$_2$ ratio, 35–45% solids) | 60–75 |
| Urea | 2–10 |
| Sugar | 0.5–3 |
| Sodium bichromate | 0.1–1 |
| Sodium fluoborate | 0.5–4 |
| Barden clay | 0–11 |
| Water | Balance to 100 parts |

5. A composition of matter comprising:

| | Percent |
|---|---|
| Sodium silicate solution (40.8° Bé) 37.7–8% solids (Na$_2$O:SiO$_2$ ratio, 1:3.3, plus a small amount of anionic wetting agent) | 67.0 |
| Urea | 5.0 |
| Tanners sugar | 1.0 |
| Sodium bichromate | 0.2 |
| Sodium fluoborate | 2.0 |
| Barden clay | 11.0 |
| Water | 13.8 |

6. A composition of matter comprising:

| | Percent |
|---|---|
| Sodium silicate solution (40.8° Bé) 37.7–8% solids (Na$_2$O:SiO$_2$ ratio, 1:3.3) | 67.0 |
| Urea | 5.0 |
| Tanners sugar | 1.0 |
| Sodium bichromate | 0.2 |
| Sodium fluoborate | 2.0 |
| Barden clay | 11.0 |
| Water | 13.8 |

References Cited in the file of this patent

UNITED STATES PATENTS

| | | |
|---|---|---|
| 944,957 | Eberhard | Dec. 28, 1909 |
| 1,247,595 | Tompkins | Nov. 20, 1917 |
| 2,069,486 | Tilden | Feb. 2, 1937 |
| 2,078,836 | Carter | Apr. 27, 1937 |
| 2,216,251 | Quisling | Oct. 1, 1940 |
| 2,671,747 | Lander | Mar. 9, 1954 |

UNITED STATES PATENT OFFICE

CERTIFICATE OF CORRECTION

Patent No. 2,788,285

April 9, 1957

James G. Lander

It is hereby certified that error appears in the printed specification of the above numbered patent requiring correction and that the said Letters Patent should read as corrected below.

Column 5, line 3, after "ratio," insert -- 1:2.5-4 --.

Signed and sealed this 2nd day of July 1957.

(SEAL)
Attest:
KARL H. AXLINE
Attesting Officer

ROBERT C. WATSON
Commissioner of Patents